United States Patent Office 3,170,859
Patented Feb. 23, 1965

3,170,859
PROCESS FOR THE PREPARATION OF SILICON FILMS
Michel Boudart, Princeton, and Peter I. Pollak, Scotch Plains, N.J., assignors to Merck & Co., Inc., Rahway, N.J., a corporation of New Jersey
No Drawing. Filed Mar. 25, 1959, Ser. No. 801,690
4 Claims. (Cl. 204—157)

This invention relates to a process for the manufacture of a silicon film and to the silicon film thus produced. More particularly, it relates to producing a film of silicon on a variety of substrates such as quartz, glass, ceramic, and metals such as copper, titanium, tin, platinum, gold, aluminum, carbon, antimony, arsenic, germanium, silicon and other conducting substrates.

Silicon is employed for the most sensitive electronic equipment and finds wide use in semiconductor and transistor devices. It is believed that silicon films or silicon films deposited on a non-contaminating carrier will be useful in the fields of electricity, heat and light. These films may thus find application in photovoltaic devices, thermoelectric devices, transistors, rectifiers, metallic mirrors, solar batteries, infrared windows and other luminescent devices.

Regarded in certain of its broader aspects the process of the present invention involves exposing silicon to hydrogen atoms whereby a film of silicon is deposited on a carrier.

In accordance with this invention, silicon in the solid state is reacted with atomic hydrogen to possibly form silicon hydride complexes ($SiH_x$ where $x=1$–$3$) which are transported out of the hydrogen atom generating field and decompose, redepositing silicon on a surface located outside the generating field.

One procedure involves carrying out the reaction in a closed vessel equipped with a hydrogen recycle. A microwave generator is mounted over one part of the reaction vessel and a rod of silicon is supported in the vessel within the microwave generator field. Hydrogen is introduced into the reactor at room temperature at a specified pressure and the hydrogen atoms are then generated in an electrodeless discharge, as for instance, in a microwave generator. The hydrogen atoms and silicon react to form silicon hydride complexes ($SiH_x$) where $x$ is 1 to 3. These complexes are transported outside the generating field and decompose, depositing silicon on the inner surface of the reactor.

The reaction vessel can be made of any dielectric material such as quartz or glass, which would not react with the hydrogen atoms. The reaction vessel can be either a closed vessel equipped with a hydrogen recycle or it can have inlet and outlet openings with a flow of hydrogen entering at one end and leaving at the other end.

The pressure in the reactor during the reaction can be between 10–1,000 microns of mercury, and the preferred pressure is 100 microns.

The silicon can be located anywhere in the reactor, provided it is within the microwave generator field. For best results, the silicon should be located at a point of maximum concentration of hydrogen atoms and the maximum surface of the silicon should be exposed to the hydrogen atoms.

The silicon film which is deposited in accordance with this invention can be formed on the inside of the reactor as indicated above, or alternatively where it is desirable to deposit the silicon film on a particular metal such as copper, carbon, arsenic, antimony, titanium, germanium or tin, a piece of the desired substrate can be placed in the reactor. The metal is placed outside the microwave generator or field and the silicon deposited on it.

It is possible to seperate the silicon film from the substrate by either heating the composition to the melting point of the substrate and thus leaving the silicon film by chemical etching techniques or by physically cutting the composition to separate the silicon film.

It has been found that this invention can also be used to purify silicon. The silicon contaminated with impurities is placed in the microwave generator field and reacted with hydrogen atoms. The silicon hydride complexes formed are transported outside the microwave generating field and decompose, depositing silicon on a pure rod of silicon located outside the microwave generating field.

The following examples are to be understood as illustrative only and are in no way to be construed as limiting the invention.

EXAMPLE 1

A one liter closed quartz reaction vessel is equipped with a hydrogen recycle. A microwave generator is mounted over part of the reaction vessel and a 5 sq. cm. wafer of silicon is supported inside the vessel within the microwave generator field. Hydrogen is circulated in the vessel within the microwave generator field at 1 to 100 microns of mercury pressure. After three hours, a film of silicon is deposited on the walls of the downstream side of the hydrogen flow outside the microwave generating field.

EXAMPLE 2

A one liter open glass reaction vessel is equipped with an inlet opening and outlet opening. A microwave generator is mounted on the outside of the reaction vessel and partially covers the vessel. A 5 sq. cm. wafer of silicon is supported in the reaction vessel within the microwave generator field and hydrogen at 1 to 100 microns of mercury pressure is passed through the microwave field. After three hours a film of silicon is deposited on the walls of the downstream side of the hydrogen flow, outside the microwave generator field.

EXAMPLE 3

A one liter closed glass reaction vessel is equipped with a hydrogen recycle. A microwave generator is mounted on the outside of the reaction vessel and partially covers the vessel. A 5 sq. cm. wafer of silicon is supported in the vessel within the microwave generator field, and a copper ring 5 sq. cm. in diameter is supported in the reaction vessel outside the microwave generator field. Hydrogen is circulated in the vessel within the microwave generator field at 1 to 100 microns of mercury pressure. After three hours a film of silicon is deposited on the copper ring.

In like manner, the above reaction can be carried out substituting a piece of carbon, arsenic antimony, titanium, germanium or tin for the copper ring, and the silicon film is then deposited on the particular metal selected. It is also possible to use two or more of these metals simultaneously and deposit the silicon film on both metals.

EXAMPLE 4

The film of silicon deposited on the quartz, glass or metals such as copper, carbon, arsenic, antimony, titanium, germanium or tin can be readily removed from the support, namely quartz, glass or metals by heating the film of silicon and the support to the melting point of the support but not high enough to melt the silicon, thus leaving the silicon film without a support. The silicon film might also be separated from the support by chemical or mechanical means, such as cutting the support off. The method of substrate removal is conditioned by the chemistry and physics of the particular substrate.

EXAMPLE 5

*Purification of silicon*

A one liter open quartz reaction vessel is equipped with an inlet opening and an outlet opening. A microwave generator is mounted on the outside of the reaction vessel and partially covers the vessel. A 6 sq. cm. wafer of an inferior grade of polycrystalline silicon having small amounts of impurities is supported in the reaction vessel within the microwave generator field. A single silicon crystal is supported in the reaction vessel outside the microwave generator field. This single crystal of silicon is heated to 1200° C. Hydrogen is passed through the vessel.

After three hours a monocrystalline film of silicon is deposited on the silicon single crystal. This single crystal is substantially pure silicon and contains none of the impurities found in the polycrystalline silicon. It is thus possible to obtain a pure silicon by this transfer procedure.

Various changes and modifications may be made in carrying out the present invention without departing from the spirit and scope thereof. Insofar as these changes and modifications are within the purview of the annexed claims, they are to be considered as part of this invention.

What is claimed is:

1. The method of forming a film of high purity silicon on a substrate which comprises flowing hydrogen into a reaction chamber, providing a mass of silicon and a substrate in said chamber with said substrate downstream of said mass of silicon in said hydrogen flow, exposing said hydrogen to a source of energy sufficient to disassociate hydrogen gas to hydrogen atoms at a point in said chamber where said hydrogen atoms thus generated contact and react with said mass of silicon to form a silicon hydride complex, and effecting deposition of silicon from said silicon hydride complexes on said substrate.

2. The process of claim 1 wherein the substrate is substantially pure silicon.

3. The process of claim 1 wherein the substrate is electrically conductive material.

4. The process of claim 1 wherein the substrate is a mass of electrically conductive material and the silicon is deposited on said substrate in the form of a film of substantially pure silicon.

References Cited in the file of this patent

UNITED STATES PATENTS

| 1,489,724 | Wendt | Apr. 8, 1924 |
| 2,768,061 | Cook et al. | Oct. 23, 1956 |
| 2,945,797 | Cherrier | July 19, 1960 |
| 2,955,966 | Sterling | Oct. 11, 1960 |
| 3,008,887 | Herglotz | Nov. 14, 1961 |

FOREIGN PATENTS

| 19,432 | Australia | Apr. 11, 1929 |
| 583,142 | Great Britain | Dec. 10, 1946 |